US011869410B2

(12) United States Patent
Zhu

(10) Patent No.: US 11,869,410 B2
(45) Date of Patent: Jan. 9, 2024

(54) DISPLAY PANEL AND DISPLAY DEVICE

(71) Applicant: Shenzhen China Star Optoelectronics Semiconductor Display Technology Co., Ltd., Shenzhen (CN)

(72) Inventor: Jing Zhu, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/771,231

(22) PCT Filed: Apr. 22, 2020

(86) PCT No.: PCT/CN2020/086010

§ 371 (c)(1),
(2) Date: Jun. 10, 2020

(87) PCT Pub. No.: WO2021/208119

PCT Pub. Date: Oct. 21, 2021

(65) Prior Publication Data

US 2023/0031812 A1 Feb. 2, 2023

(30) Foreign Application Priority Data

Apr. 13, 2020 (CN) ......................... 202010285575.8

(51) Int. Cl.
*G09G 3/20* (2006.01)

(52) U.S. Cl.
CPC ... *G09G 3/2092* (2013.01); *G09G 2300/0452* (2013.01); *G09G 2300/0465* (2013.01); *G09G 2310/0267* (2013.01); *G09G 2310/061* (2013.01)

(58) Field of Classification Search
CPC ......... G09G 3/2092; G09G 2300/0452; G09G 2310/0267; G09G 2310/061
See application file for complete search history.

(56) References Cited

U.S. PATENT DOCUMENTS

2016/0019856 A1 1/2016 Tanaka et al.
2016/0267831 A1* 9/2016 Seo ...................... G09G 3/2085
2017/0047030 A1* 2/2017 Kim ..................... G09G 3/3677
2017/0193939 A1 7/2017 Lee et al.
(Continued)

FOREIGN PATENT DOCUMENTS

CN 101978409 A 2/2011
CN 104934005 A 9/2015
(Continued)

*Primary Examiner* — Benjamin C Lee
*Assistant Examiner* — Nathan P Brittingham
(74) *Attorney, Agent, or Firm* — Nathan & Associates; Menachem Nathan

(57) ABSTRACT

The present application discloses a display panel and a display device. The display panel includes a plurality of pixel unit groups. Each pixel unit group includes a first row of pixel units and a second row of pixel units, which are adjacently disposed. A first gate driver on array (GOA) circuit unit electrically connected to the first row of pixel units and a second GOA circuit unit electrically connected to the second row of pixel units are further disposed between the first row of pixel units and the second row of pixel units. The first GOA circuit unit and the second GOA circuit unit share at least one signal transmission line.

18 Claims, 4 Drawing Sheets

(56) References Cited

U.S. PATENT DOCUMENTS

| | | | | |
|---|---|---|---|---|
| 2019/0103049 | A1 | 4/2019 | Noh et al. | |
| 2021/0366336 | A1* | 11/2021 | Zhu | G09G 3/20 |

FOREIGN PATENT DOCUMENTS

| | | | | | |
|---|---|---|---|---|---|
| CN | 105164743 | A | | 12/2015 | |
| CN | 105355179 | A | * | 2/2016 | G09G 3/36 |
| CN | 106098698 | A | | 11/2016 | |
| CN | 106932936 | A | | 7/2017 | |
| CN | 110599898 | A | | 12/2019 | |
| CN | 110767097 | A | | 2/2020 | |
| KR | 20180115205 | A | | 10/2018 | |

* cited by examiner

DISPLAY PANEL AND DISPLAY DEVICE

FIELD OF APPLICATION

The present application is related to the field of display technology, and specifically, to a display panel and a display device.

BACKGROUND OF APPLICATION

Gate driver on array (GOA) technology is a technology that directly forms gate driver circuits on array substrates to replace driver chips made of external silicon chips. A GOA circuit is formed on a substrate around a display region, which simplifies manufacturing processes of a display panel and eliminates a bonding process in a direction of horizontal scan lines. This increases production capacity, reduces product costs, and improves integration of the display panel to make it more suitable for making narrow border or borderless products to satisfy a visual pursuit of modern people.

Currently, large-sized, high-resolution, and super-narrow border (SNB) designs of display screens have become a development trend. Moreover, requirements for designing narrow borders of spliced display screens are even more inevitable. Technology of GOA produced in a display region (GOA in AA) is increasingly favored.

However, with resolutions become higher and sizes of pixels become smaller, a layout space of the GOA becomes larger. Designing the GOA in the AA region leads to a decrease in an aperture ratio and a serious lack of transmittance. Therefore, a problem of increasing the transmittance needs to be solved to achieve the narrow border.

SUMMARY OF APPLICATION

The present application provides a display panel and a display device, which can increase transmittance of a display panel by reducing a total number of signal transmission lines and increasing an aperture ratio of the display panel.

In a first aspect, the display panel provided by the present application includes a plurality of rows of pixel units. Every two rows of pixel units in the plurality of rows of the pixel units compose a pixel unit group. Each of the pixel unit group includes a first row of pixel units and a second row of pixel units, which are adjacently disposed.

The display panel further includes a first gate driver on array (GOA) circuit unit disposed between the first row of pixel units and the second row of pixel units and a second GOA circuit unit disposed between the first GOA circuit unit and the second row of pixel units. The first GOA circuit unit is electrically connected to the first row of pixel units. The second GOA circuit unit is electrically connected to the second row of pixel units.

The first GOA circuit unit and the second GOA circuit unit share at least one signal transmission line. Each of the signal transmission line is respectively electrically connected to the first GOA circuit unit and the second GOA circuit unit.

In the display panel provided by the present application, the at least one signal transmission line includes at least one of a first low-frequency clock signal transmission line or a second low-frequency clock signal transmission line.

In the display panel provided by the present application, the at least one signal transmission line further includes a reset signal transmission line.

In the display panel provided by the present application, the at least one signal transmission line further includes a power signal transmission line.

In the display panel provided by the present application, the at least one signal transmission line is disposed between the first GOA circuit unit and the second GOA circuit unit. The first GOA circuit unit is electrically connected to the at least one signal transmission line in one-to-one correspondence through at least one first bridge line. The second GOA circuit unit is electrically connected to the at least one signal transmission line in one-to-one correspondence through at least one second bridge line.

In the display panel provided by the present application, the first GOA circuit unit includes two first sub-GOA circuit units disposed in parallel;

the second GOA circuit unit includes two second sub-GOA circuit units disposed in parallel; the two second sub-GOA circuit units one-to-one correspond to the two first sub-GOA circuit units; and the first sub-GOA circuit unit and the second sub-GOA circuit unit arranged in a same column share the at least one signal transmission line.

In the display panel provided by the present application, the display panel further includes a GOA bus unit. The GOA bus unit is disposed at a periphery of the plurality of rows of pixel units.

The GOA bus unit includes at least one signal transmission bus extending in a column direction.

The at least one signal transmission line is electrically connected to the at least one signal transmission bus in one-to-one correspondence.

In the display panel provided by the present application, the at least one signal transmission bus includes at least one of a first low-frequency clock signal transmission bus, a second low-frequency clock signal transmission bus, a reset signal transmission bus, or a power signal transmission bus.

In the display panel provided by the present application, the display panel further includes a display region and a frame region at a periphery of the display region. The GOA bus unit is disposed in the frame region. The plurality of rows of pixel units, the first GOA circuit unit, and the second GOA circuit unit are disposed in the display region.

In the display panel provided by the present application, the display panel further includes:

a first gate line disposed between the first row of pixel units and the first GOA circuit unit and corresponding to the first row of pixel units, wherein the first GOA circuit unit is electrically connected to the first row of pixel units through the first gate line; and a second gate line disposed between the second row of pixel units and the second GOA circuit unit and corresponding to the second row of pixel units, wherein the second GOA circuit unit is electrically connected to the second row of pixel units through the second gate line.

In the display panel provided by the present application, each of the pixel units includes any one of a red pixel unit, a green pixel unit, or a blue pixel unit.

In a second aspect, the present application further provides the display device including the display panel and a circuit board. The display panel includes a plurality of rows of pixel units. Every two rows of pixel units in the plurality of rows of the pixel units compose a pixel unit group. Each of the pixel unit group includes a first row of pixel units and a second row of pixel units, which are adjacently disposed.

The display panel further includes a first gate driver on array (GOA) circuit unit disposed between the first row of pixel units and the second row of pixel units and a second GOA circuit unit disposed between the first GOA circuit unit and the second row of pixel units. The first GOA circuit unit is electrically connected to the first row of pixel units. The second GOA circuit unit is electrically connected to the second row of pixel units.

The first GOA circuit unit and the second GOA circuit unit share at least one signal transmission line. Each of the signal transmission line is respectively electrically connected to the first GOA circuit unit and the second GOA circuit unit.

The circuit board is electrically connected to the first GOA circuit unit and the second GOA circuit unit.

In the display device provided by the present application, the at least one signal transmission line includes at least one of a first low-frequency clock signal transmission line or a second low-frequency clock signal transmission line.

In the display device provided by the present application, the at least one signal transmission line further includes a reset signal transmission line.

In the display device provided by the present application, the at least one signal transmission line further includes a power signal transmission line.

In the display device provided by the present application, the at least one signal transmission line is disposed between the first GOA circuit unit and the second GOA circuit unit. The first GOA circuit unit is electrically connected to the at least one signal transmission line in one-to-one correspondence through at least one first bridge line. The second GOA circuit unit is electrically connected to the at least one signal transmission line in one-to-one correspondence through at least one second bridge line.

In the display device provided by the present application, the first GOA circuit unit includes two first sub-GOA circuit units disposed in parallel.

The second GOA circuit unit includes two second sub-GOA circuit units disposed in parallel. The two second sub-GOA circuit units one-to-one correspond to the two first sub-GOA circuit units.

The first sub-GOA circuit unit and the second sub-GOA circuit unit arranged in a same column share the at least one signal transmission line.

In the display device provided by the present application, the display panel further includes a GOA bus unit. The GOA bus unit is disposed at a periphery of the plurality of rows of pixel units.

The GOA bus unit includes at least one signal transmission bus extending in a column direction.

The at least one signal transmission line is electrically connected to the at least one signal transmission bus in one-to-one correspondence.

In the display device provided by the present application, the at least one signal transmission bus includes at least one of a first low-frequency clock signal transmission bus, a second low-frequency clock signal transmission bus, a reset signal transmission bus, or a power signal transmission bus.

In the display device provided by the present application, the display panel further includes:

- a first gate line disposed between the first row of pixel units and the first GOA circuit unit and corresponding to the first row of pixel units, wherein the first GOA circuit unit is electrically connected to the first row of pixel units through the first gate line; and
- a second gate line disposed between the second row of pixel units and the second GOA circuit unit and corresponding to the second row of pixel units, wherein the second GOA circuit unit is electrically connected to the second row of pixel units through the second gate line.

Compared with the prior art, the display panel and the display device provided by the present application dispose two stages of the GOA circuit units (the first GOA circuit unit and the second GOA circuit unit) between two adjacent rows of the pixel units (the first row of pixel units and the second row of pixel units). The two stages of the GOA circuit units respectively provide gate signals to the two rows of the pixel units, and they share at least one signal transmission line, so as to use every signal transmission line to transmit a same signal to the two stages of the GOA circuit units. This reduces a total number of the signal transmission lines, thereby reducing an area occupied by the signal transmission lines in the display region, and the saved area can be used to increase an aperture ratio of the pixel units, thereby increasing transmittance of the display panel.

DESCRIPTION OF DRAWINGS

The following describes specific embodiments of the present application in detail with reference to the accompanying drawings, which will make technical solutions and other beneficial effects of the present application obvious.

DETAILED DESCRIPTION OF PREFERRED EMBODIMENTS

Figure 1:
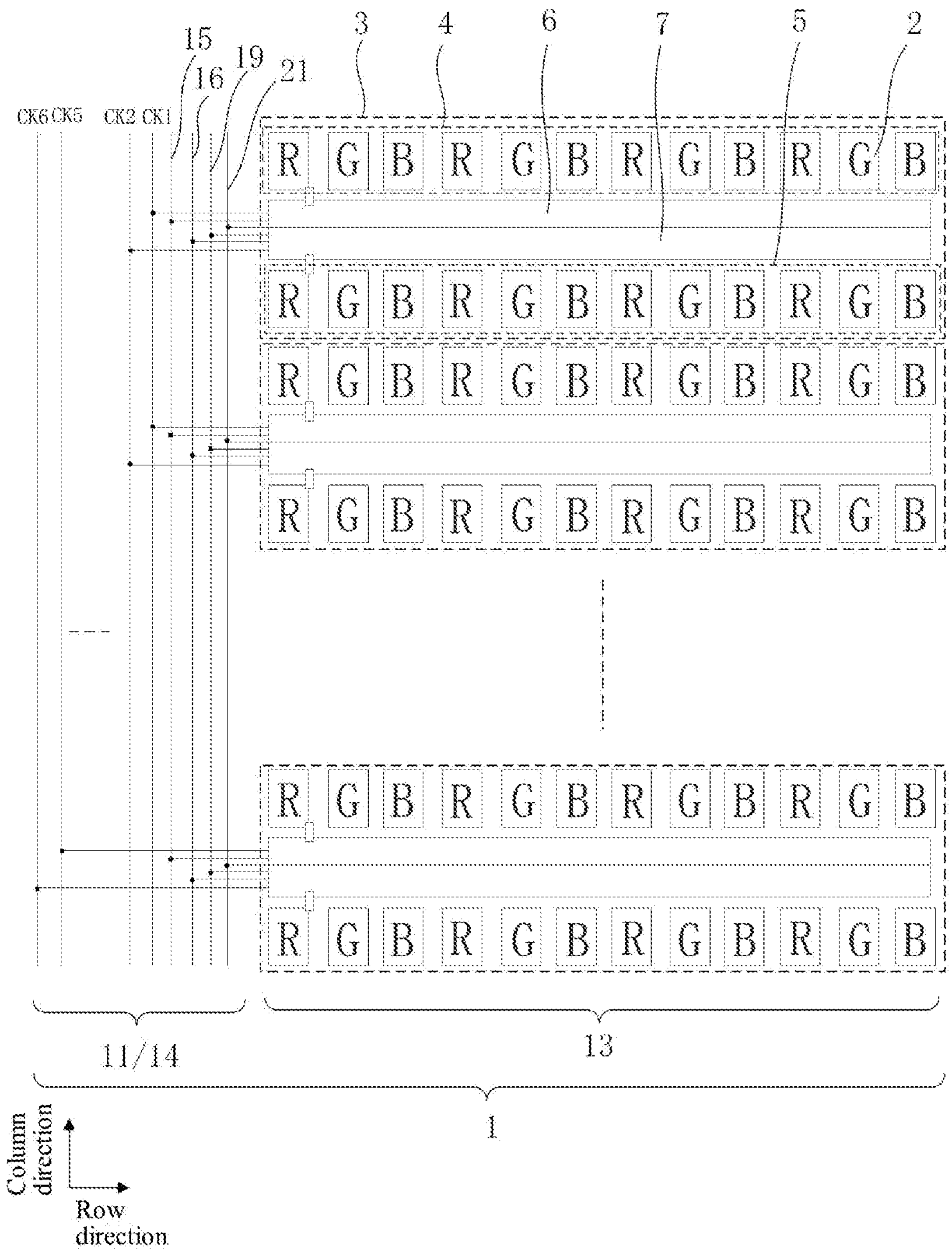
FIG. 1 is a structural diagram of a display panel provided by an embodiment of the present application.

To further explain the technical means and effects of the present application, the following refers to embodiments and drawings for detailed description. Obviously, the described embodiments are only for some embodiments of the present application, instead of all embodiments. Based on the embodiments of the present application, all other embodiments obtained by those skilled in the art without creative work fall into a protection scope of the present application.

Generally, a gate driver on array (GOA) type display panel adopts a GOA circuit to drive the display panel for normal display. The GOA circuit includes a GOA bus unit and a GOA circuit unit. After drive signals such as a high-frequency clock signal CK, a low-frequency clock signal LC, a reset signal RST, and a power signal VSS are input from a circuit board to an array substrate of the display panel, they need to pass through the GOA bus unit to reach a gate drive circuit which is the GOA circuit unit, so as to realize precise control for every gate line (scan line).

For a GOA in AA type display panel, with a gradual increase of sizes and resolutions of the display panel, a resistance-capacitance (RC) load of the GOA bus unit becomes heavy, and it is not suitable to be place into a display region. The GOA bus unit is generally disposed in a border region of the display panel, and the GOA circuit unit in the GOA circuit is disposed in the display region, so as to achieve a narrow border. In an exemplary GOA in AA type display panel, a plurality of rows of pixel units and a plurality of stages of the GOA circuit unit are alternately arranged in sequence in the display region, so that each stage of the GOA circuit unit corresponds to a row of the pixel units. Because the GOA bus unit includes a plurality of signal transmission buses which are used to respectively transmit different driving signals, each stage of the GOA circuit unit needs to be electrically connected to each of the plurality of signal transmission buses through a plurality of signal transmission lines in one-to-one correspondence. For example, the GOA bus unit includes a first low-frequency clock signal (LC1) transmission bus, a second low-frequency clock signal (LC2) transmission bus, a reset signal (RST) transmission bus, a power signal (VSS) transmission bus, and a multi-stage high-frequency clock signal (CK) transmission bus. Then, a first low-frequency clock signal transmission line, a second low-frequency clock signal transmission line, a reset signal transmission line, a power signal transmission line, and a multi-stage high-frequency clock signal transmission line are disposed between each stage of the GOA circuit unit and the GOA bus unit.

With the increase in resolution of the display panel, a number of the GOA circuit units is also increased. Because every GOA circuit unit requires the plurality of signal transmission lines to achieve signal transmission, a number of the signal transmission lines is greatly increased, which means that an area of the display region occupied by the signal transmission lines is greatly increased. The increase in the number of the GOA circuit units reduces an aperture area of the pixel units in the display region, thereby affecting transmittance of the display panel. In order to solve the above problems, embodiments of the present application provide a display panel and a display device.

As shown in FIG. 1, an embodiment of the present application provides a display panel 1. The display panel includes a plurality of rows of pixel units, wherein each row of the pixel units includes a plurality of pixel units 2 arranged adjacent to each other in sequence along a row direction (e.g., horizontal direction); every two rows of pixel units in the plurality of rows of the pixel units compose a pixel unit group 3, and each of the pixel unit group 3 includes a first row of pixel units 4 and a second row of pixel units 5, which are adjacently disposed; a first GOA circuit unit 6 disposed between the first row of pixel units 4 and the second row of pixel units 5; and a second GOA circuit unit 7 disposed between the first GOA circuit unit 6 and the second row of pixel units 5. The first GOA circuit unit 6 is electrically connected to the first row of pixel units 4 to provide gate signals for the first row of pixel units 4. The second GOA circuit unit 7 is electrically connected to the second row of pixel units 5 to provide the gate signals for the second row of pixel units 5. The first GOA circuit unit 6 and the second GOA circuit unit 7 share at least one signal transmission line. Each of the signal transmission line is respectively electrically connected to the first GOA circuit unit 6 and the second GOA circuit unit 7. It should be explained that the at least one signal transmission line mentioned in this embodiment of the present application refers to a signal transmission line shared by the first GOA circuit unit 6 and the second GOA circuit unit 7.

Figure 2:
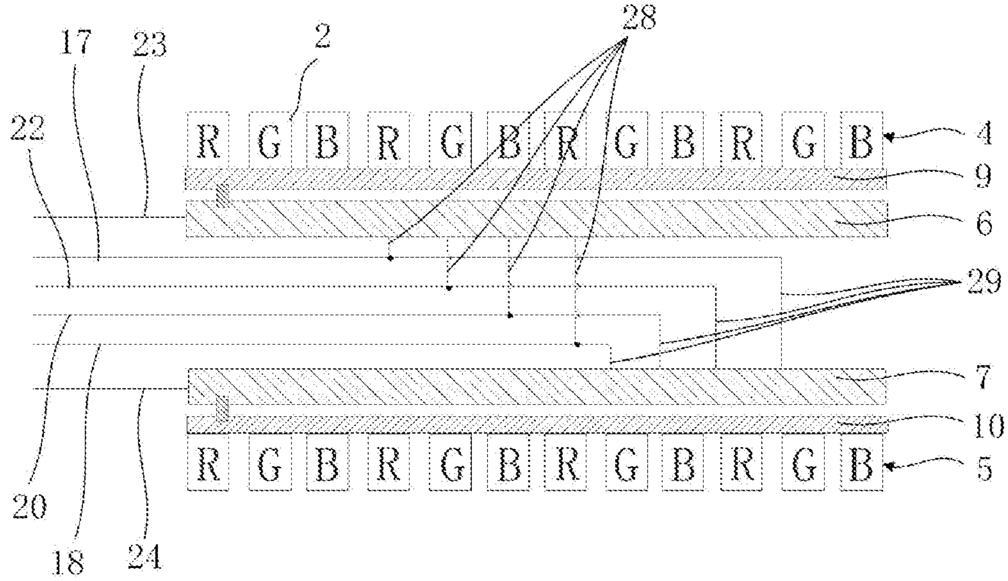
FIG. 2 is a schematic diagram of a connection between a first gate driver on array (GOA) circuit unit and a second GOA circuit unit of each pixel unit and the signal transmission line in FIG. 1.

Specifically, as shown in FIG. 2, the display panel 1 further includes a first gate line 9 disposed between the first row of pixel units 4 and the first GOA circuit unit 6 and a second gate line 10 disposed between the second row of pixel units 5 and the second GOA circuit unit 7. The first gate line 9 corresponds to the first row of pixel units 4. The first GOA circuit unit 6 is electrically connected to the first row of pixel units 4 through the first gate line 9. The first GOA circuit unit 6 inputs the gate signals to the first gate line 9 to provide the gate signals for the first row of pixel units 4. The second gate line 10 corresponds to the second row of pixel units 5. The second GOA circuit unit 7 is electrically connected to the second row of pixel units 5 through the second gate line 10. The second GOA circuit unit 7 inputs the gate signals to the second gate line 10 to provide the gate signals for the second row of pixel units 5.

Specifically, as shown in FIG. 1, the display panel 1 further includes a GOA bus unit 11. The GOA bus unit 11 is disposed at a periphery of the plurality of rows of pixel units. The GOA bus unit 11 includes at least one signal transmission bus extending in a column direction (e.g., vertical direction). The at least one signal transmission line is electrically connected to the at least one signal transmission bus in one-to-one correspondence, in other words, one end of each signal transmission line is correspondingly electrically connected to the signal transmission bus and is respectively electrically connected to the first GOA circuit unit 6 and the second GOA circuit unit 7 in a direction away from the signal transmission bus. The row and column directions in this embodiment are perpendicular to each other. The GOA bus unit 11 and the first GOA circuit unit 6 and the second GOA circuit unit 7 in all pixel unit groups 3 compose a GOA driving circuit. It should be explained that the at least one signal transmission bus mentioned in this embodiment of the present application refers to the signal transmission bus that outputs same electrical signals to the first GOA circuit unit 6 and the second GOA circuit unit 7, which is the signal transmission bus corresponding to at least one signal transmission line in one-to-one correspondence.

Specifically, the display panel 1 further includes a display region 13 and a frame region 14 at a periphery of the display region 13. The GOA bus unit 11 is disposed in the frame region 14 of the display panel 1. The plurality of rows of pixel units 2, the first GOA circuit unit 6, and the second GOA circuit unit 7 are disposed in the display region 13. The signal transmission line is used to transmit the electrical signals on the signal transmission bus to the first GOA circuit unit 6 and the second GOA circuit unit 7. Each signal transmission line is partially located in the display region 13, and another portion is located in the frame region 14.

In an embodiment, as shown in FIG. 1, the at least one signal transmission bus includes a first low-frequency clock signal (LC1) transmission bus 15 and a second low-frequency clock signal (LC2) transmission bus. Correspondingly, as shown in FIG. 2, the at least one signal transmission line includes a first low-frequency clock signal transmission line 17 and a second low-frequency clock signal transmission line 18. That is, the first GOA circuit unit 6 and the second GOA circuit unit 7 are electrically connected to a first low-frequency clock signal transmission bus 15 through the first low-frequency clock signal transmission line 17 for receiving the first low-frequency clock signal LC1. Also, the first GOA circuit unit 6 and the second GOA circuit unit 7 are electrically connected to a second low-frequency clock signal transmission bus 16 through the second low-frequency clock signal transmission line 18 for receiving the second low-frequency clock signal LC2. Of course, the at least one signal transmission line can further include any one of the first low-frequency clock signal transmission line 17 or the second low-frequency clock signal transmission line 18, so that the first GOA circuit unit 6 and the second GOA circuit unit 7 share only one low-frequency clock signal transmission line.

In an embodiment, as shown in FIG. 1, the at least one signal transmission bus further includes a reset signal (RST) transmission bus 19. Correspondingly, as shown in FIG. 2, the at least one signal transmission line further includes a reset signal transmission line 20. In other words, the first GOA circuit unit 6 and the second GOA circuit unit 7 are electrically connected to the reset signal transmission bus 19 through the reset signal transmission line 20 for receiving the reset signal RST.

In an embodiment, as shown in FIG. 1, the at least one signal transmission bus further includes a power signal (VSS) transmission bus 21. Correspondingly, as shown in FIG. 2, the at least one signal transmission line further includes a power signal transmission line 22. In other words, the first GOA circuit unit 6 and the second GOA circuit unit 7 are electrically connected to the power signal transmission bus 21 through the power signal transmission line 22 for receiving the power signal VSS. Specifically, the power signal VSS includes any one of a first low-level signal VSSG or a second low-level signal VSSQ.

In an embodiment, as shown in FIG. 2, each signal transmission line is disposed between the first GOA circuit unit 6 and the second GOA circuit unit 7, for example, the first low-frequency clock signal transmission line 17, the second low-frequency clock signal transmission line 18, the reset signal transmission line 20, and the power signal transmission line 22 are disposed between the first GOA circuit unit 6 and second GOA circuit unit 7. The first GOA circuit unit 6 is electrically connected to each signal transmission line in one-to-one correspondence through a first bridge line 28. The second GOA circuit unit 7 is electrically connected to each signal transmission line in one-to-one correspondence through a second bridge line 29. A number of the first bridge line 28 is equal to a number of the signal transmission lines. Also, a number of the second bridge line 29 is equal to a number of the signal transmission lines. Different signal transmission lines are arranged at intervals, for example, they are arranged in parallel to each other. Different first bridge lines 28 and different second bridge lines 29 are also arranged at intervals.

Specifically, as shown in FIG. 1, the GOA bus unit 11 further includes a plurality of high-frequency clock signal (CK) transmission buses, for example, CK1 to CKn, where n is an integer greater than or equal to two, and in this embodiment, n is equal to six. In each pixel unit group 3, the first GOA circuit unit 6 is electrically connected to one of the plurality of high-frequency clock signal transmission buses (e.g., CK1) through the first high-frequency clock signal transmission line 23 for receiving the first high-frequency clock signal; and the second GOA circuit unit 7 is electrically connected to another one of the plurality of high-frequency clock signal transmission buses (e.g., CK2) which is different from the first GOA circuit unit 6 through the second high-frequency clock signal transmission line 24 for receiving the second high-frequency clock signal.

Specifically, each of the pixel units 2 includes any one of a red pixel unit (R), a green pixel unit (G), or a blue pixel unit (B).

In this embodiment, two stages of the GOA circuit units (the first GOA circuit unit 6 and the second GOA circuit unit 7) are disposed between two adjacent rows of the pixel units (the first row of pixel units 4 and the second row of pixel units 5). The two stages of the GOA circuit units respectively provide gate signals to the two rows of the pixel units, and they share at least one signal transmission line, so as to use every signal transmission line to transmit a same signal to the two stages of the GOA circuit units. This reduces a total number of the signal transmission lines, thereby reducing an area occupied by the signal transmission lines in the display region 13, and the saved area can be used to increase an aperture ratio of the pixel units 2, thereby increasing transmittance of the display panel 1.

Figure 3:
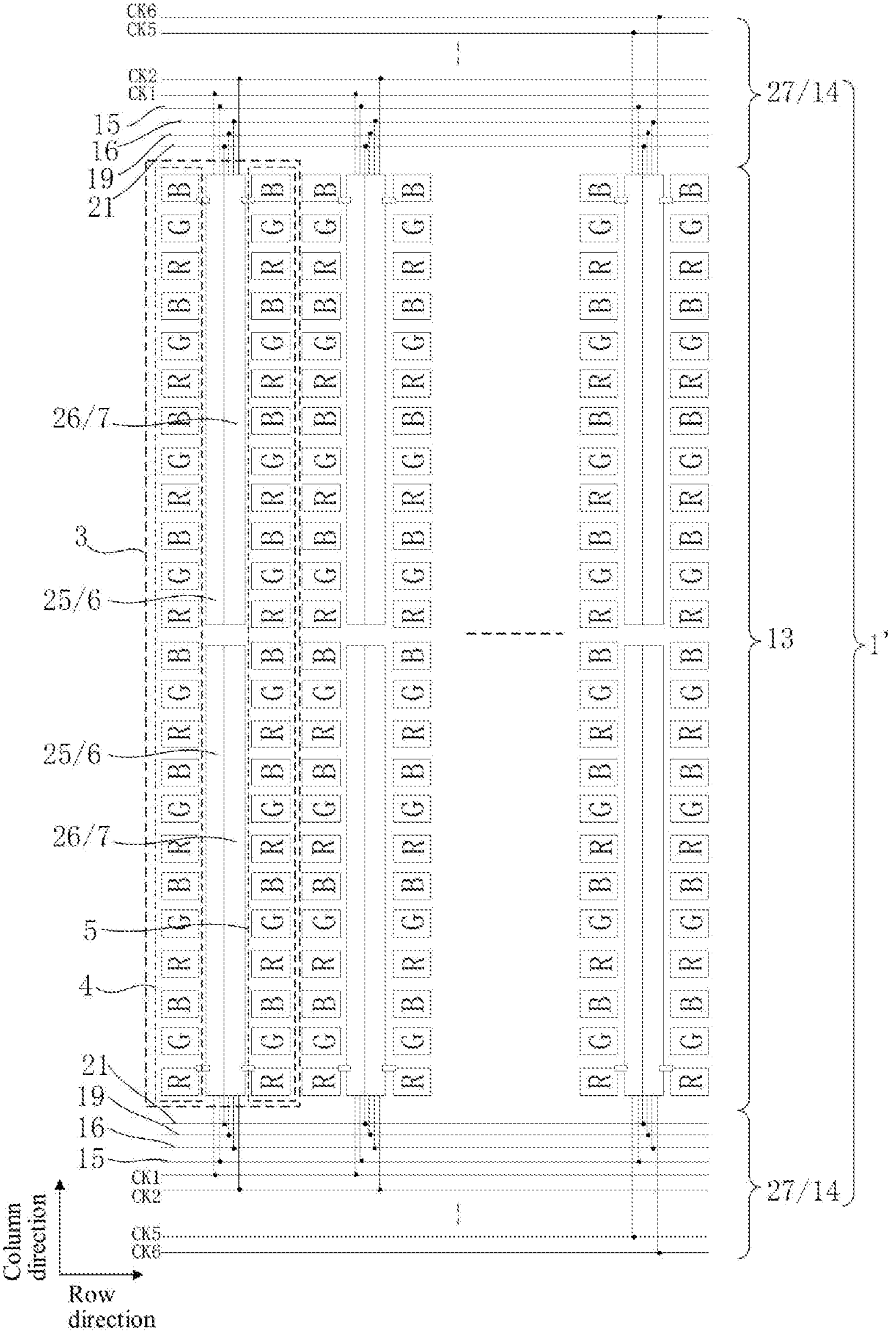
FIG. 3 is a structural diagram of another display panel provided by an embodiment of the present application
Figure 4:
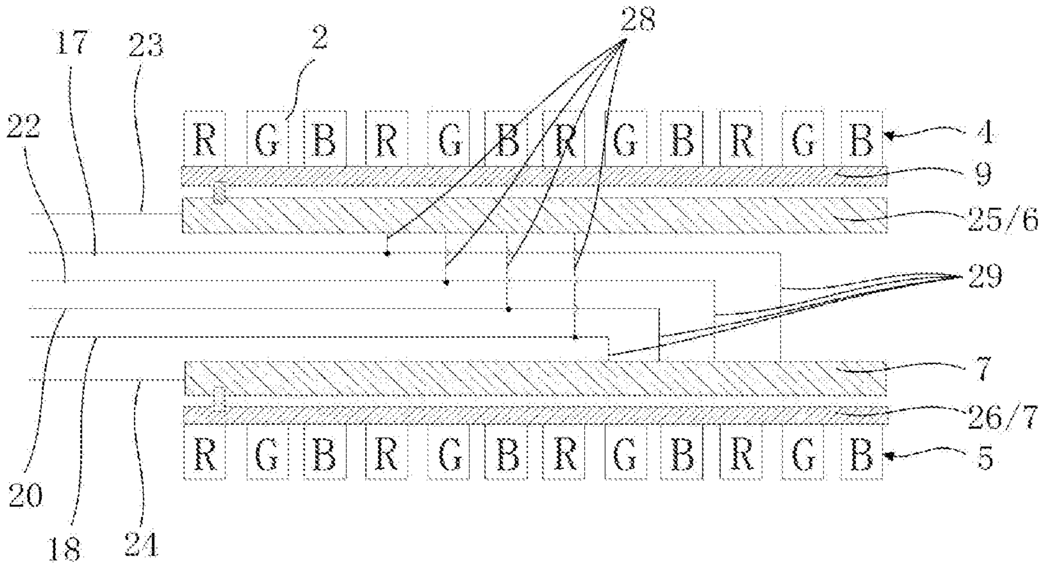
FIG. 4 is a schematic diagram of a connection between a first GOA circuit unit and a second GOA circuit unit arranged in a same column of each pixel unit and the signal transmission line in FIG. 3.

As shown in FIGS. 3 and 4, an embodiment of the present application further provides another display panel 1', which is different from the above embodiment in that the GOA circuit in this embodiment is a dual-drive circuit.

Specifically, in each pixel unit group 3, the first GOA circuit unit 6 includes two first sub-GOA circuit units 25 arranged side by side in a row direction; the second GOA circuit unit 7 includes two second sub-GOA circuit units 26 arranged in parallel in the row direction; the two second sub-GOA circuit units 26 one-to-one correspond to the two first sub-GOA circuit units 25; and the first sub-GOA circuit unit 25 and the second sub-GOA circuit unit 26 share the at least one signal transmission line. In other words, if the first sub-GOA circuit unit 25 and the second sub-GOA circuit unit 26 arranged in a same column are used as a group, two groups of the signal transmission lines are required to correspond to the two groups of the first sub-GOA circuit unit 25 and the second sub-GOA circuit unit 26. Each group of the signal transmission lines includes the at least one signal transmission line.

Specifically, the two first sub-GOA circuit units 25 are electrically connected to the first gate line 9 and input the gate signals to the first gate line 9. The two second sub-GOA circuit units 26 are electrically connected to the second gate line 10 and input the gate signals to the second gate line 10. By inputting the gate signals to the same gate line through the two sub-GOA circuit units at a same time, a driving capability can be enhanced, which is beneficial to increase response speed and a display effect of the display panel 1'.

Specifically, the frame region 14 of the display panel 1' is respectively located on opposite two sides of the display region 13. The GOA bus unit 11 includes two sub-GOA bus units 27, which are respectively located in the frame region 14 on two sides of the display region 13. The first sub-GOA circuit unit 25 and the second sub-GOA circuit unit 26 arranged in the same column are electrically connected to the adjacent (closer in distance) sub-GOA bus unit 27.

Specifically, as shown in FIG. 3, each sub-GOA bus unit 27 includes a first low-frequency clock signal (LC1) transmission bus 15 extending in the column direction, a second low-frequency clock signal (LC2) transmission bus 16, a reset signal (RST) transmission bus 19, and a power signal (VSS) transmission bus 21. Correspondingly, as shown in FIG. 4, the at least one signal transmission line includes a first low-frequency clock signal transmission line 17, a second low-frequency clock signal transmission line 18, a reset signal transmission line 20, and a power signal transmission line 22. Furthermore, one end of the first low-frequency clock signal transmission line 17, the second low-frequency clock signal transmission line 18, the reset signal transmission line 20, and the power signal transmission line 22 are electrically connected to the first low-frequency clock signal (LC1) transmission bus 15, the second low-frequency clock signal (LC2) transmission bus 16, the reset signal (RST) transmission bus 19, and the power signal (VSS) transmission bus 21 in one-to-one correspondence.

In an embodiment, two groups of the signal transmission lines are same. This embodiment of the present application only uses a positional relationship between one group of the signal transmission lines and the corresponding first sub-GOA circuit unit 25 and second sub-GOA circuit unit 26 arranged in a same column for description. As shown in FIG. 4, one group of signal transmission lines is disposed between the corresponding first sub-GOA circuit unit 25 and second sub-GOA circuit unit 26 arranged in the same column. Each group of the signal transmission lines includes the first low-frequency clock signal transmission line 17, the second low-frequency clock signal transmission line 18, the reset signal transmission line 20, and the power signal transmission line 22, which are disposed between the corresponding first sub-GOA circuit unit 25 and the second sub-GOA circuit unit 26 arranged in the same column. The first sub-GOA circuit unit 25 is electrically connected to each signal transmission line in one-to-one correspondence through a first bridge line 28. The second sub-GOA circuit unit 26 is electrically connected to each signal transmission line in one-to-one correspondence through a second bridge line 29.

Specifically, as shown in FIG. 3, each sub-GOA bus unit 27 further includes a plurality of high-frequency clock signal (CK) transmission buses, for example, CK1 to CKn, where n is an integer greater than or equal to two, and in this embodiment, n is equal to six. In each pixel unit group 3, the first sub-GOA circuit units 25 disposed in a same column is electrically connected to one of the plurality of high-frequency clock signal transmission buses (e.g., CK1) through the first high-frequency clock signal transmission line 23 for receiving the first high-frequency clock signal; and the second sub-GOA circuit units 26 are electrically connected to another one of the plurality of high-frequency clock signal transmission buses (e.g., CK2) which is different from the first sub-GOA circuit unit 25 disposed in the same column through the second high-frequency clock signal transmission line 24 for receiving the second high-frequency clock signal.

In this embodiment, in an aspect, each gate line inputs the gate signals through two sub-GOA circuit units, which is a dual-drive structure, which can effectively enhance the driving capability. Therefore, transmission efficiency of the driving signals is effectively increased, and attenuation of the driving signals is reduced, thereby increasing the response speed and the display effect of the display panel 1. In another aspect, the display panel 1' of the dual-drive structure requires more GOA circuit units, which means more signal transmission lines. In this embodiment, each group of first sub-GOA circuit units 25 and second sub-GOA circuit units 26 disposed in the same column share four signal transmission line. This reduces the total number of the signal transmission lines, thereby reducing the area occupied by the signal transmission lines in the display region 13, and the saved area can be used to increase the aperture ratio of the pixel units, thereby increasing the transmittance of the display panel 1.

Figure 5:
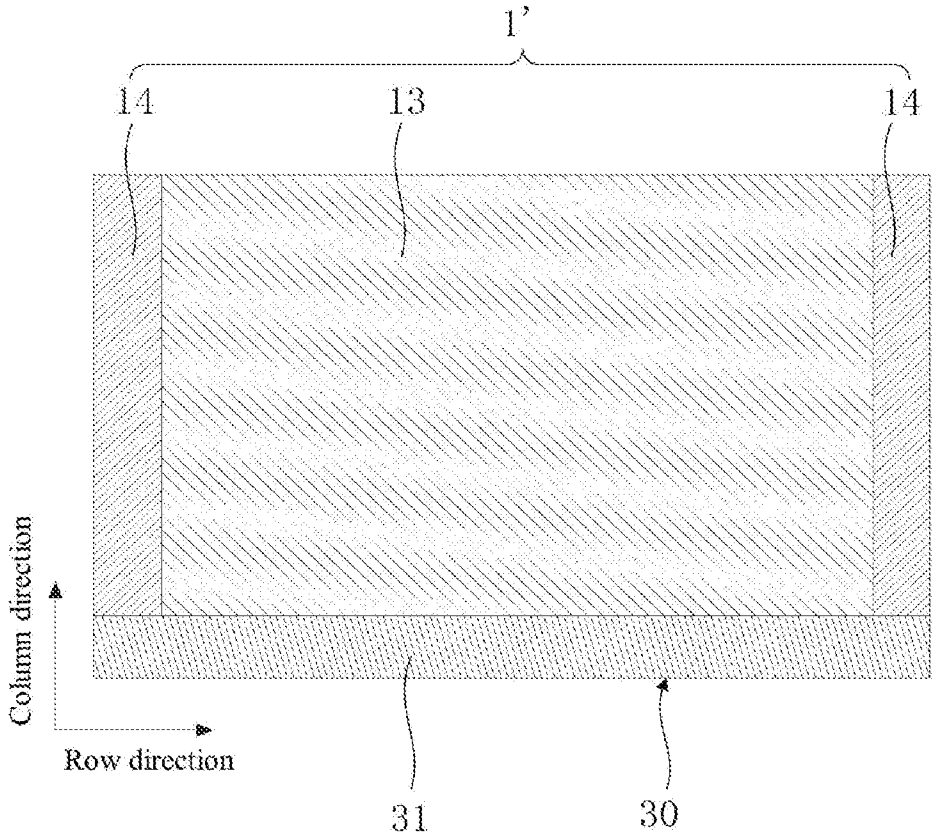
FIG. 5 is a structural diagram of a display device provided by an embodiment of the present application.

As shown in FIG. 5, an embodiment of the present application further provides a display device 30 including any one of the display panels in the above embodiments, such as the display panel 1 and the display panel 1'. In this embodiment, the display panel 1' is taken as an example. The display device 30 further includes a circuit board 31 electrically connected to the first GOA circuit unit and the second GOA circuit unit of the display panel 1'.

Specifically, the circuit board 31 is electrically connected to the first GOA circuit unit and the second GOA circuit unit through the GOA bus unit and is used to provide a driving signal to control the display panel 1' to display normally.

In this embodiment, two stages of the GOA circuit units (the first GOA circuit unit and the second GOA circuit unit) are disposed between two adjacent rows of the pixel units (the first row of pixel units and the second row of pixel units). The two stages of the GOA circuit units respectively provide gate signals to the two rows of the pixel units, and they share at least one signal transmission line, so as to use every signal transmission line to transmit a same signal to the two stages of the GOA circuit units. This reduces a total number of the signal transmission lines, thereby reducing an area occupied by the signal transmission lines in the display region 13, and the saved area can be used to increase an aperture ratio of the pixel units, thereby increasing transmittance of the display device 30.

In the above embodiments, the descriptions of the various embodiments are different in emphases, for contents not described in detail, please refer to related description of other embodiments.

The display panel and the display device provided by embodiments of the present application are described in detail above, and the description of embodiments above is only for helping to understand technical solutions of the present application and its core idea. Understandably, for a person of ordinary skill in the art can make various modifications of the technical solutions of the embodiments of the present application above. However, it does not depart from the scope of the technical solutions of the embodiments of the present application.

What is claimed is:

1. A display panel, comprising:

a plurality of rows of pixel units, wherein every two adjacent rows of pixel units in the plurality of rows of the pixel units compose a pixel unit group comprising a first row of pixel units and a second row of pixel units;

a first gate driver on array (GOA) circuit unit disposed between the first row of pixel units and the second row of pixel units;

a second GOA circuit unit disposed between the first GOA circuit unit and the second row of pixel units to be opposite to the first GOA circuit unit, wherein the first GOA circuit unit is electrically connected to the first row of pixel units, and the second GOA circuit unit is electrically connected to the second row of pixel units; and at least one signal transmission line extending, in a row direction of the first row or the second row, between the first GOA circuit unit and the second GOA circuit unit, wherein each of the at least one signal transmission line is electrically connected to the first GOA circuit unit and the second GOA circuit unit respectively through a first bridge line and a second bridge line, each of the first bridge line and the second bridge line extending in a column direction perpendicular to the row direction.

2. The display panel as claimed in claim 1, wherein the at least one signal transmission line comprises at least one of a first clock signal transmission line or a second clock signal transmission line.

3. The display panel as claimed in claim 2, wherein the at least one signal transmission line further comprises a reset signal transmission line.

4. The display panel as claimed in claim 2, wherein the at least one signal transmission line further comprises a power signal transmission line.

5. The display panel as claimed in claim 1, wherein the first GOA circuit unit comprises two first sub-GOA circuit units disposed in parallel, and the second GOA circuit unit comprises two second sub-GOA circuit units disposed in parallel; and the two second sub-GOA circuit units one-to-one correspond to the two first sub-GOA circuit units, and the first sub-GOA circuit unit and the second sub-GOA circuit unit arranged in a same column share the at least one signal transmission line.

6. The display panel as claimed in claim 1, further comprising a GOA bus unit;

wherein the GOA bus unit is disposed at a periphery of the plurality of rows of pixel units and comprises at least one signal transmission bus extending in the column direction; and wherein the at least one signal transmission line is electrically connected to the at least one signal transmission bus in one-to-one correspondence.

7. The display panel as claimed in claim 6, wherein the at least one signal transmission bus comprises at least one of a first clock signal transmission bus, a second clock signal transmission bus, a reset signal transmission bus, or a power signal transmission bus.

8. The display panel as claimed in claim 6, further comprising a display region and a frame region at a periphery of the display region;

wherein the GOA bus unit is disposed in the frame region, and the plurality of rows of pixel units, the first GOA circuit unit, and the second GOA circuit unit are disposed in the display region.

9. The display panel as claimed in claim 1, further comprising:

a first gate line disposed between the first row of pixel units and the first GOA circuit unit and corresponding to the first row of pixel units, wherein the first GOA circuit unit is electrically connected to the first row of pixel units through the first gate line; and a second gate line disposed between the second row of pixel units and the second GOA circuit unit and corresponding to the second row of pixel units, wherein the second GOA circuit unit is electrically connected to the second row of pixel units through the second gate line.

10. The display panel as claimed in claim 1, wherein each of the pixel units comprises any one of a red pixel unit, a green pixel unit, or a blue pixel unit.

11. A display device, comprising the display panel as claimed in claim 1 and a circuit board electrically connected to the first GOA circuit unit and the second GOA circuit unit.

12. The display device as claimed in claim 11, wherein the at least one signal transmission line comprises at least one of a first clock signal transmission line or a second clock signal transmission line.

13. The display device as claimed in claim 12, wherein the at least one signal transmission line further comprises a reset signal transmission line.

14. The display device as claimed in claim 12, wherein the at least one signal transmission line further comprises a power signal transmission line.

15. The display device as claimed in claim 11, wherein the first GOA circuit unit comprises two first sub-GOA circuit units disposed in parallel, and the second GOA circuit unit comprises two second sub-GOA circuit units disposed in parallel; and the two second sub-GOA circuit units one-to-one correspond to the two first sub-GOA circuit units, and the first sub-GOA circuit unit and the second sub-GOA circuit unit arranged in a same column share the at least one signal transmission line.

16. The display device as claimed in claim 11, further comprising a GOA bus unit;

wherein the GOA bus unit is disposed at a periphery of the plurality of rows of pixel units and comprises at least one signal transmission bus extending in the column direction; and wherein the at least one signal transmission line is electrically connected to the at least one signal transmission bus in one-to-one correspondence.

17. The display device as claimed in claim 16, wherein the at least one signal transmission bus comprises at least one of a first clock signal transmission bus, a second clock signal transmission bus, a reset signal transmission bus, or a power signal transmission bus.

18. The display device as claimed in claim 11, further comprising:

a first gate line disposed between the first row of pixel units and the first GOA circuit unit and corresponding to the first row of pixel units, wherein the first GOA circuit unit is electrically connected to the first row of pixel units through the first gate line; and a second gate line disposed between the second row of pixel units and the second GOA circuit unit and corresponding to the second row of pixel units, wherein the second GOA circuit unit is electrically connected to the second row of pixel units through the second gate line.

* * * * *